(12) United States Patent
Önneby et al.

(10) Patent No.: US 7,868,079 B2
(45) Date of Patent: Jan. 11, 2011

(54) FIELD GRADING MATERIAL

(75) Inventors: Carina Önneby, Västerås (SE); Anders Gustafsson, Alingsås (SE); Eva Mårtensson, Västerås (SE); Lars Palmovist, Alingsås (SE); Richard W. Siegel, Menands, NY (US); Jung-Il Hong, Troy, NY (US); Linda Schadler Feist, Clifton Park, NY (US)

(73) Assignee: ABB Research Ltd., Zürich (CH)

( * ) Notice: Subject to any disclaimer, the term of this patent is extended or adjusted under 35 U.S.C. 154(b) by 929 days.

(21) Appl. No.: 10/531,998

(22) PCT Filed: Oct. 20, 2003

(86) PCT No.: PCT/SE03/01615

§ 371 (c)(1),
(2), (4) Date: Dec. 21, 2005

(87) PCT Pub. No.: WO2004/038735

PCT Pub. Date: May 6, 2004

(65) Prior Publication Data

US 2006/0145119 A1    Jul. 6, 2006

(30) Foreign Application Priority Data

Oct. 22, 2002 (SE) .................................. 0203121

(51) Int. Cl.
*C08K 3/18* (2006.01)
*H01L 23/552* (2006.01)

(52) U.S. Cl. ....................................... 524/431; 257/659
(58) Field of Classification Search ................. 524/431
See application file for complete search history.

(56) References Cited

U.S. PATENT DOCUMENTS

| | | | | |
|---|---|---|---|---|
| 6,228,904 B1 * | 5/2001 | Yadav et al. | ................. | 523/210 |
| 2002/0070428 A1 * | 6/2002 | Bernhoff et al. | ............ | 257/618 |

FOREIGN PATENT DOCUMENTS

| | | |
|---|---|---|
| CN | 1188779 A | 7/1998 |
| JP | 10116702 A | 5/1998 |
| WO | WO 20042034409 A1 | 4/2004 |

OTHER PUBLICATIONS

U.S. Appl. No. 60/415,187, filed Nov. 19, 2003, Nelson.
Carina Önneby et al.; Electrical Properties of Field Grading Materials Influenced by the Silicon Carbide Grain Size; IEEE 7th International Conference on Solid Dielectrics; Jun. 2001; pp. 43-45; Eindhoven The Netherlands.

* cited by examiner

*Primary Examiner*—Ling-Siu Choi
*Assistant Examiner*—Hui Chin
(74) *Attorney, Agent, or Firm*—Venable LLP; Eric J. Franklin

(57) ABSTRACT

A field grading material including a polymeric matrix provided with a filler. The filler includes a field grading effective amount of particles having at least one dimension smaller than or equal to 100 nm. A device including the field grading material for grading an electric field in high-voltage applications and a method for grading an electric field at a joint or termination of an electric power cable using the field grading material.

30 Claims, 3 Drawing Sheets

FIELD GRADING MATERIAL

TECHNICAL FIELD OF THE INVENTION AND PRIOR ART

The present invention relates to a field grading material consisting of a polymeric matrix provided with filler particles as well as a device for grading an electric field in high-voltage applications. The invention also relates to a method for grading an electric field at a joint or termination of an electric power cable.

At the transition of an electric field from a first medium to a second medium, electric stresses harmful to the electric equipment can ensue due to a discontinuity in the electric field. In a shielded high-voltage cable for instance, the electric field is uniform along the cable axis and there is variation in the field only in the radial direction. When the cable is terminated or spliced, the shield of the cable is removed for a distance along the cable. The removal of the shield causes a discontinuity in the electric field at the shield end, resulting in high electric stresses. These high stresses must be reduced in order not to impair the expected life of the system.

The electric stresses in question can be reduced by grading the electric field at the transition of the electric field from the first medium to the second medium, e.g. from a shielded cable part to a cable part where the original shield has been removed. A number of methods have been developed and employed for this kind of field grading. The present invention is related to so called resistive and capacitive field grading.

The resistive field grading can be used in alternating current as well as direct current applications. Resistive field grading can also be used in order to achieve field grading when voltages are occurring in the form of impulses. In case of a cable ending of the kind indicated above, a body having a suitable resistance is introduced around the unshielded part of the cable in the area closest to the shielded part of the cable and in electric contact with the shield. When a positive voltage is applied across the cable a current flows through the body towards the shield of the cable, which shield is at earth potential. A resistive voltage drop then occurs in the body, which results in a more uniform distribution of the potential. This potential distribution will be more linear if the body consists of a material exhibiting a non-linear electrical resistance that decreases with an increasing electric field. The closer to the edge of the shield, the higher the electric field in the field grading body and, consequently, the lower the electrical resistance in the body if the body exhibits such a non-linear electrical resistance. In this way, the voltage drop along the field grading body will become more uniformly distributed in a body that exhibits such a non-linear electrical resistance than in a body that does not.

The capacitive field grading is used in alternating current applications. Capacitive field grading can also be used in order to achieve field grading when voltages are occurring in the form of impulses. In case of a cable ending of the kind indicated above, a body of a material having a dielectric constant higher than that of the insulation and as low losses as possible is introduced around the unshielded part of the cable in the area closest to the shielded part of the cable and in electric contact with the shield, whereby a spreading of the equipotential lines will be achieved. Capacitive field grading properties are also desired in a material adapted for grading the electric field in high-voltage direct current applications so as to achieve an effective field grading in case of suddenly occurring voltage surges.

SUMMARY OF THE INVENTION

The object of the present invention is to provide an improved field grading material.

It has been found that the use of a filler essentially consisting of nanoscale particles, i.e. particles having at least one dimension smaller than or equal to 100 nm, results in percolation at a lower filler concentration in the material as compared to a corresponding material comprising a filler consisting of particles of larger size. Thus, with the material according to the invention, desired field grading properties can be obtained with a relatively low concentration of filler in the matrix, implying improved processability and improved mechanical properties of the field grading material. The lower the concentration of filler in the matrix, the better the processability and the better mechanical properties of the field grading material.

Furthermore, the use of a filler essentially consisting of nanoscale particles results in increased electrical breakdown strength of the field grading material as compared to a corresponding material comprising a filler consisting of particles of larger size. The electrical breakdown strength of the field grading material also increases with decreasing filler concentration. Consequently, the invention makes it possible to achieve a field grading material having very high electrical breakdown strength and thus being well suited for high-voltage applications.

In this description and the subsequent claims the term "nano-sized particles" refers to particles having at least one dimension smaller than or equal to 100 nm, e.g. particles having a width, length and/or height smaller than or equal to 100 nm. The nano-sized particles may of course have several or all dimensions smaller than or equal to 100 nm. The nano-sized particles may e.g. be essentially spherical or cylindrical with a diameter smaller than or equal to 100 nm. It is emphasised that the nano-sized particles of the filler may have any shape as long as they in at least one of their dimensions are smaller than or equal to 100 nm.

In this description and the subsequent claims the term "field grading effective amount of filler particles" refers to an amount of filler particles that is sufficient for giving the material the desired field grading properties.

According to a preferred embodiment of the invention, the filler comprises a field grading effective amount of particles having one dimension between 2-80 nm, preferably 5-50 nm and most preferably 5-30 nm. It has been found that the above indicated advantages of the inventional field grading material are further improved when the size of the filler particles decreases from 100 nm and downwards. However, it is considered that a dimension of about 2 nm of the particles is the practical lower limit. If the particles are smaller than that, it will be very difficult to disperse the particles in the material and to prevent the particles from agglomerating.

A filler exhibits an essential increase in surface area per unit volume when the dimension of the particles in the filler decreases from 100 nm and downwards. The surface area per unit volume of the filler as a function of the particle size is illustrated in FIG. 1 for spherical filler particles that are fully dispersed in a matrix material. This increase of the surface area per unit volume is believed to be an important reason for the beneficial effects associated with the field grading material according to the invention.

Further preferred embodiments of the field grading material according to the invention will appear from the subsequent description.

The invention also relates to a device for grading an electric field in high-voltage applications.

The invention also relates to a method for grading an electric field at a joint or termination of an electric power cable.

BRIEF DESCRIPTION OF THE DRAWINGS

With reference to the enclosed drawings, a more specific description of embodiment examples of the invention will follow hereinbelow.

In the drawings

DETAILED DESCRIPTION OF PREFERRED EMBODIMENTS OF THE INVENTION

The field grading material according to the present invention consists of a polymeric matrix provided with a filler. The filler comprises a field grading effective amount of particles having at least one dimension smaller than or equal to 100 nm.

Figure 1:
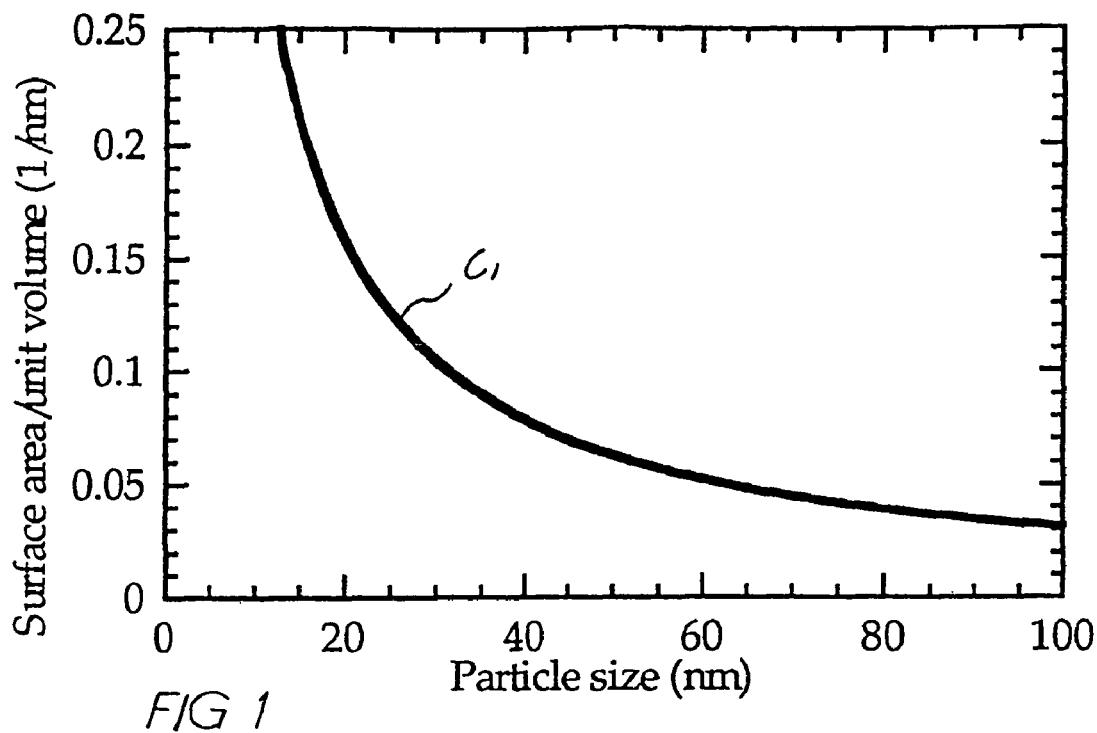
FIG. 1 is a diagram showing the surface area per unit volume as a function of the particle size for particles, fully dispersed in a matrix material, having a spherical shape.

The surface area per unit volume of a filler comprising spherical particles as a function of the particle size is illustrated in FIG. 1. From the diagram of FIG. 1, it can be seen that a filler exhibits an essential increase in surface area per unit volume of a fully dispersed filler when the dimension of the particles in the filler decreases from 100 nm and downwards. The gradient of the curve $C_1$ showing the surface area per unit volume of a filler as a function of the particle size increases rapidly as the size of the particles is gradually reduced below 100 nm. It has been found that several important properties associated with the field grading effects of a field grading material of the above-indicated kind are essentially and surprisingly improved as the dimension of the particles in the filler is reduced below 100 nm.

The polymeric matrix in the field grading material according to the invention is suitably provided with a filler comprising a field grading effective amount of particles having at least one dimension between 2-80 nm, preferably 5-50 nm and most preferably 5-30 nm.

Figure 2:
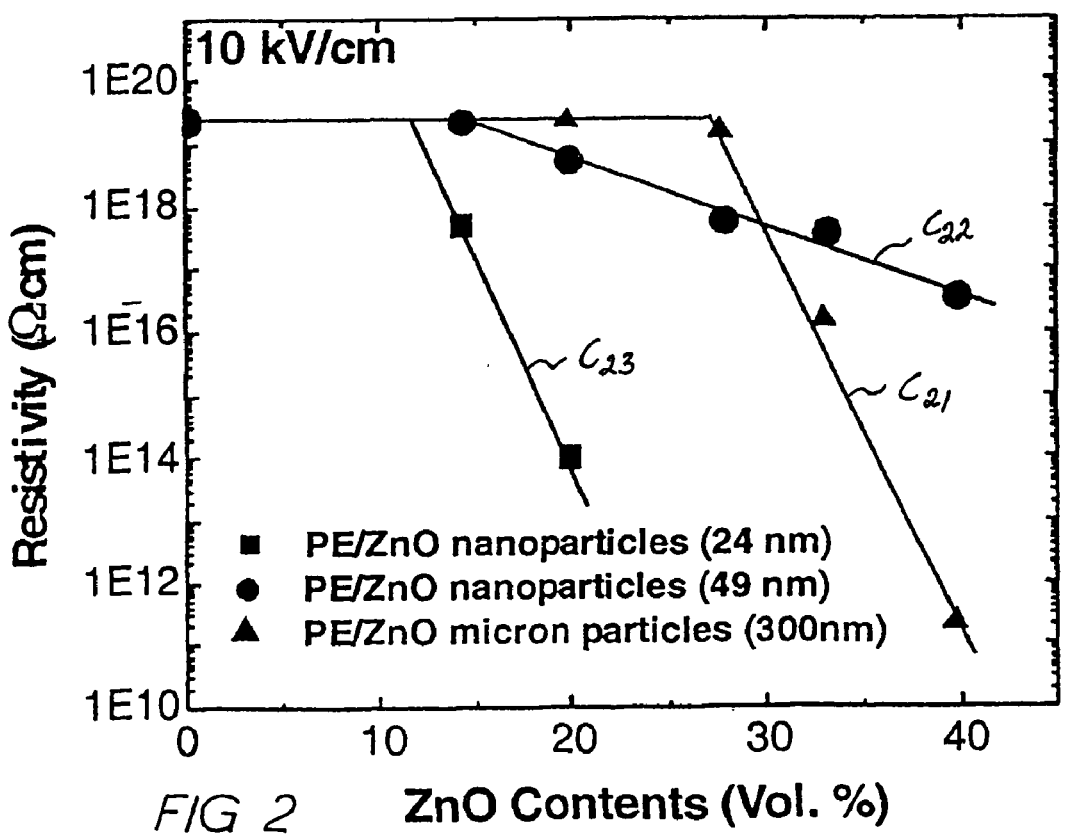
FIG. 2 is a diagram showing the electrical resistivity of different field grading materials as a function of filler concentration.

FIG. 2 is a diagram showing the electrical resistivity of some different field grading materials as a function of filler concentration (percentage by volume). A first curve $C_{21}$ is related to a field grading material consisting of a matrix of LDPE provided with a filler of ZnO-particles having an average size of about 0.3 μm (300 nm). A second curve $C_{22}$ is related to a field grading material consisting of a matrix of LDPE provided with a filler of ZnO-particles having an average size of about 49 nm. A third curve $C_{23}$ is related to a field grading material consisting of a matrix of LDPE provided with a filler of ZnO-particles having an average size of about 24 nm. It is evident from this diagram that percolation begins at an essentially lower filler concentration for the materials comprising nano-sized filler particles (curves $C_{22}$ and $C_{23}$) as compared to the material comprising micro-sized filler particles (curve $C_{21}$). For the materials related to the curves $C_{22}$ and $C_{23}$ percolation begins at a filler concentration of about 12% by volume and 15% by volume, respectively, whereas percolation begins at a filler concentration of about 28% by volume for the material related to the curve $C_{21}$. The smaller the size of the particles, the lower the filler concentration required for percolation.

Figure 3:
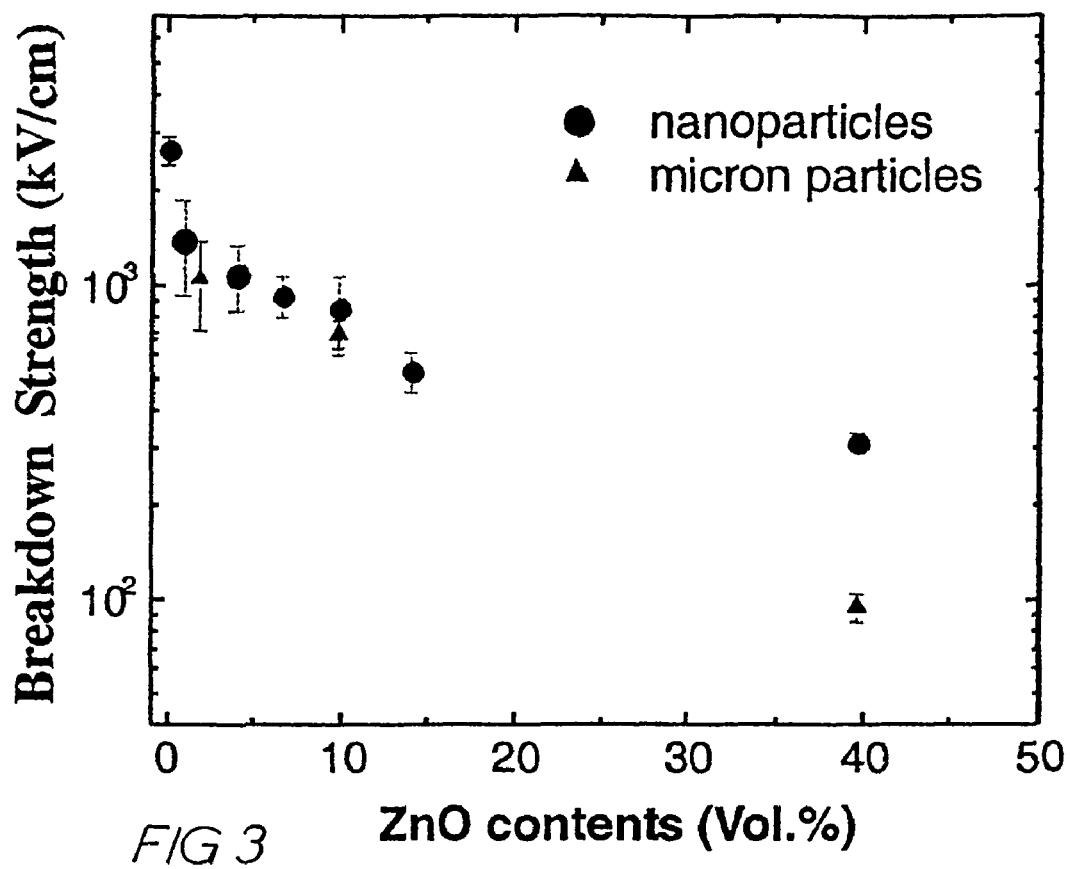
FIG. 3 is a diagram showing the electrical breakdown strength of different field grading materials as a function of filler concentration.

FIG. 3 is a diagram showing the electrical breakdown strength of two different field grading materials as a function of filler concentration (percentage by volume). One of the sets of measured data points in FIG. 3 is related to a field grading material consisting of a matrix of LDPE provided with a filler of ZnO-particles having an average size of about 0.3 μm (i.e. micro-sized particles). The other set of measured data points in FIG. 3 is related to a field grading material consisting of a matrix of LDPE provided with a filler of ZnO-particles having an average size of about 50 nm (i.e. nano-sized particles). It can be seen in this diagram that the material comprising nano-sized filler particles has a higher electrical breakdown strength than the material comprising micro-sized filler particles at a given filler concentration. Consequently, a higher electrical breakdown strength of a field grading material can be obtained when using nano-sized filler particles as compared to using micro-sized filler particles. Thus, a field grading material comprising nano-sized particles is suitable for high-voltage applications. It can also be seen in the diagram that the electrical breakdown strength of the respective field grading material increases with decreasing filler concentration.

The nano-sized filler particles suitably constitute less than 40% by volume, preferably less than 30% by volume and most preferably less than 20% by volume of the field grading material.

The polymeric matrix of the field grading material according to the present invention suitably consists, or at least essentially consists, of rubber, thermoplastics or thermoplastic elastomer. It is preferred that the matrix consists, or at least essentially consists, of polyolefin rubber or thermoplastic polyolefin elastomer/plastomer, preferably including EPDM (Ethylene Propylene Diene Monomer) rubber or silicone rubber, or of crystalline thermoplastics, preferably polyethylene.

The nano-sized filler particles are suitably dispersed in the polymeric matrix by ordinary melt-mixing.

According to a first variant of the invention, the filler is of a material where the bulk has a dielectric constant at infinitely high frequencies of at least 5, preferably $Al_2O_3$, $TiO_2$ or $BaTiO_3$. This implies that the field grading material has effective capacitive field grading properties in possible combination with resistive field grading properties. It is previously known that the dielectric constant of a material consisting of a polymeric matrix with filler is fairly independent of the size of the high dielectric constant particles of the filler. However, it has surprisingly been found that there is a dramatic increase in the dielectric constant when the size of the particles in the filler is decreased to such an extent that the particles have one dimension smaller than or equal to 100 nm. Therefore, by decreasing the size of the high dielectric constant particles in the filler to such an extent that the particles have one dimension smaller than or equal to 100 nm, a field grading material having a desired dielectric constant can be obtained with a filler concentration being essentially lower as compared to a corresponding material comprising a filler consisting of particles of larger size.

Figure 4:
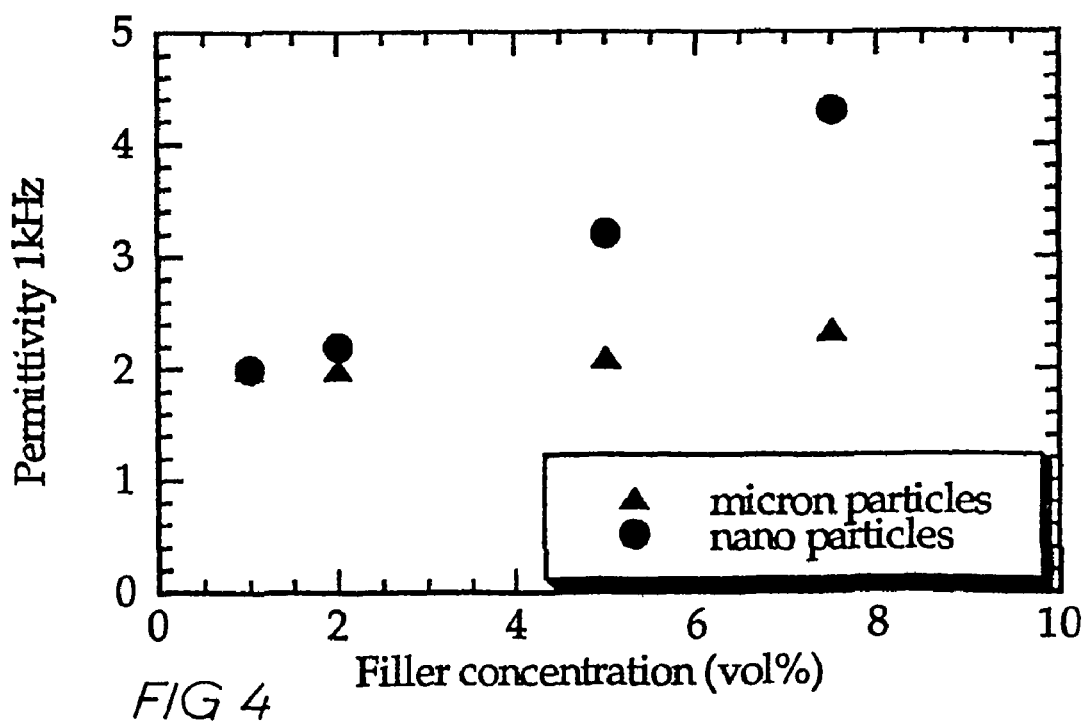
FIG. 4 is a diagram showing the dielectric constant (permittivity) of different field grading materials at 1 kHz as a function of filler concentration.

FIG. 4 is a diagram showing the dielectric constant (permittivity) of two different field grading materials, which are subjected to an alternating voltage having a frequency of 1 kHz, as a function of filler concentration (percentage by volume). One of the sets of measured data points in FIG. 4 is related to a field grading material consisting of a matrix of Engage® provided with a filler of $Al_2O_3$-particles having an average size larger than 100 nm, i.e. micro-sized particles. The other set of measured data points in FIG. 4 is related to a field grading material consisting of a matrix of Engage® provided with a filler of $Al_2O_3$-particles having an average size of about 33 nm, i.e. nano-sized particles. It can be seen in this diagram that the material comprising nano-sized filler particles has a higher dielectric constant than the material comprising micro-sized filler particles at a given filler concentration.

According to a second variant of the invention, the filler is of a semiconducting material, i.e. a material having an energy bandgap larger than 0 eV and smaller than about 5 eV, preferably ZnO or SiC. The use of semiconducting filler materials, such as ZnO or SiC, normally results in a non-linear electrical resistance of the field grading material, i.e. a resistance that decreases with an increasing electric field. This non-linearity of the resistance can be favourable in certain applications as previously indicated. The onset of the non-linearity of the resistance, i.e. the electrical field strength at which the resistance changes from an essentially linear to an essentially non-linear behaviour, increases with decreasing size of the particles in the filler. Thus, a material according to this variant of the invention exhibits an onset of the non-linearity of the resistance being at a higher field strength as compared to a corresponding material comprising a filler consisting of particles of larger size. When the onset of the non-linearity of the resistance is at a higher field strength, reliable resistive field grading at high electrical fields becomes possible. This may be combined with suitable capacitive field grading properties.

Figure 5:
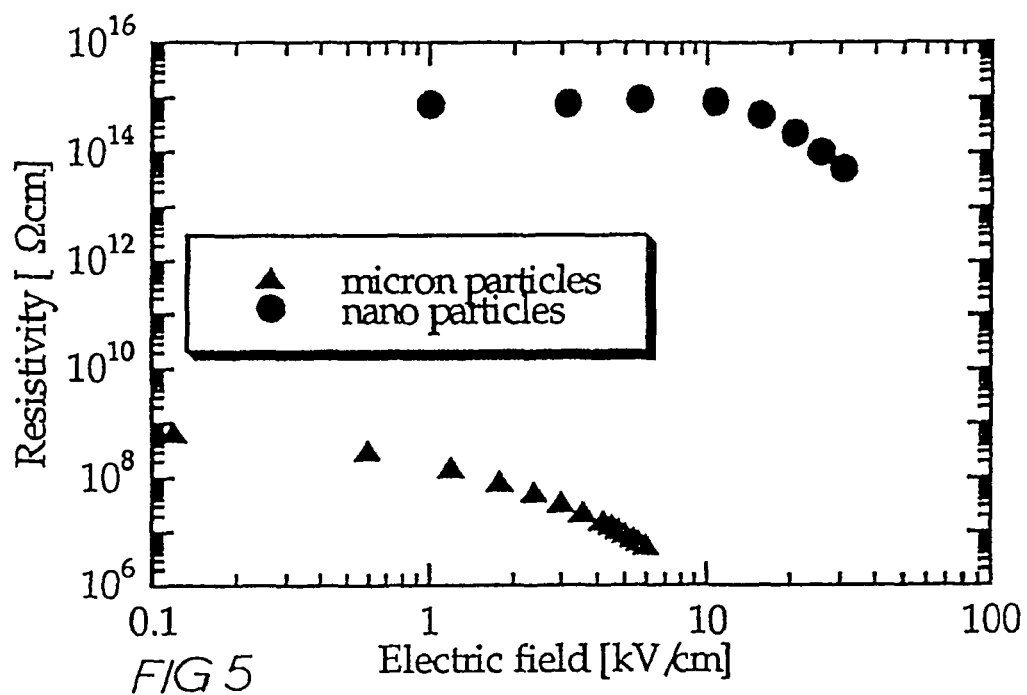
FIG. 5 is a diagram showing the electrical resistivity of different SiC fillers as a function of electric field strength.

FIG. 5 is a diagram showing the electrical resistivity of different SiC fillers as a function of electric field strength. One of the sets of measured data points in FIG. 5 is related to a pure SiC powder comprising SiC particles having an average size of about 10 μm, i.e. micro-sized particles. The other set of measured data points in FIG. 5 is related to a pure SiC powder comprising SiC particles having an average size of about 20 nm, i.e. nano-sized particles. It can be seen in this diagram that the material comprising nano-sized particles exhibits an onset of the non-linearity of the resistance being at a higher electric field strength, about 10 kV/cm, as compared to the material comprising micro-sized particles, for which the onset of the non-linearity of the resistance is below 1 kV/cm.

For a material comprising particles of micro-size and larger, the onset of the non-linearity of the resistance is essentially reciprocally proportional to the particle size. It has however been noticed that the onset of the non-linearity of the resistance is not reciprocally proportional to the particle size for a material comprising particles of nano-size. This is advantageous since the onset of the non-linearity of the resistance would have been at a far too high electric field strength for a material comprising a filler of nano-sized particles if the reciprocal proportionality had applied also for nano-sized particles.

According to a preferred embodiment of the invention, the nano-sized filler particles essentially have a high aspect ratio, i.e. an aspect ratio of more than 1, preferably more than 5 and most preferably more than 10. Said particles may be provided in the form of fibres, fibrils, whiskers, flakes, tubes, ellipsoids etc.

If the particles having a high aspect ratio are randomly oriented in the matrix, an isotropic field grading material is obtained. The use of such particles randomly oriented in the matrix results in percolation at a lower filler concentration as compared to a corresponding material comprising a filler consisting of particles having essentially a spherical shape.

If the particles having a high aspect ratio are oriented to extend essentially in the same direction in the matrix, i.e. if they are oriented in a specific preferred direction in the matrix, an anisotropy in field grading properties is conferred to the field grading material, which anisotropy can be favourable in certain applications.

Figure 6:
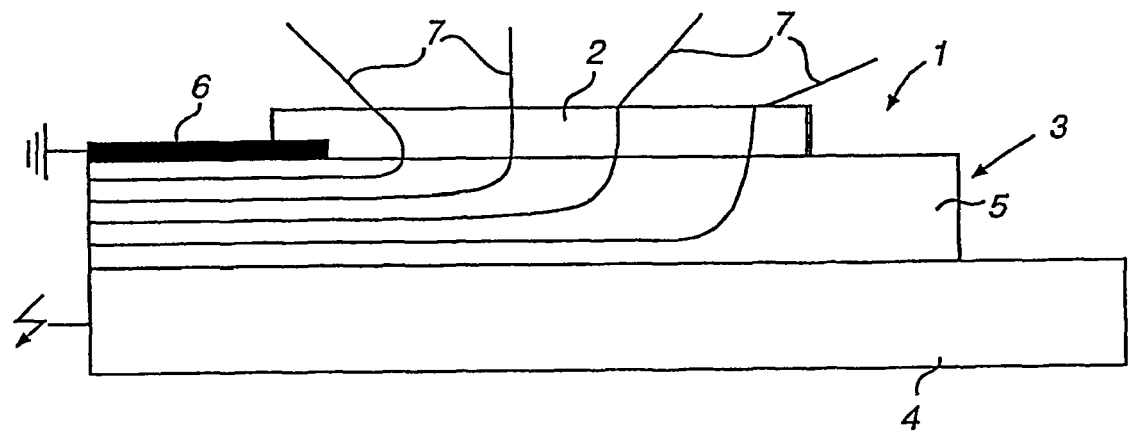
FIG. 6 is a schematic longitudinal sectional of a termination of an electric power cable, provided with a body of field grading material according to the invention.

A field grading material according to the invention is suitable for use at a joint or termination of an electric power cable, in which case a body comprising the field grading material is introduced in the cable joint or cable termination. FIG. 6 schematically illustrates a cable termination 1 provided with a body 2 of field grading material according to the present invention. The cable 3 comprises a conductor 4 surrounded by an insulation 5. A shield 6 is arranged outside the insulation 5, said shield being connected to ground. The end of the cable 3 is unshielded, i.e. at the end of the cable the insulation 5 is not covered by any shield. The body 2 of field grading material is introduced around the unshielded part of the cable in the area closest to the shielded part of the cable and in electric contact with the shield 6. The body 2 of field grading material will secure a uniform distribution of the potential at the cable termination, as illustrated by the equipotential lines 7 in FIG. 6. Only the upper half of the longitudinal section of the cable termination is shown in FIG. 6.

A field grading material according to the invention is particularly suitable for use in a device for grading an electric field in high-voltage applications. Such a device could e.g. comprise a body 2 of the type illustrated in FIG. 6 for use at a cable termination or cable joint or in any other type of application where a grading of an electric field is required.

The invention is of course not in any way limited to the preferred embodiments described above. On the contrary, several possibilities to modifications thereof should be evident to a person skilled in the art, without deviating from the basic idea of the invention as defined in the appended claims. It is for instance possible to include an additional smaller amount of micro-sized filler particles in the matrix, as long as the essential field grading effects are defined by the nano-sized filler particles included in the matrix.

The invention claimed is:

1. A field grading material for grading an electric field in high voltage applications, the field grading material comprising:
   a polymeric matrix comprising a filler, wherein the filler comprises a resistive and/or capacitive field grading effective amount of particles having at least one dimension smaller than or equal to 100 nm, wherein said particles comprise any semiconducting material having an energy bandgap larger than 0 eV and smaller than 5 eV, wherein the particles are dispersed in the polymeric matrix, and wherein the field grading material comprises less than 40% by volume of the filler particles.

2. The field grading material according to claim 1, wherein the filler comprises a field grading effective amount of particles having one dimension between 2-80 nm.

3. The field grading material according to claim 1, wherein said particles comprise any material where the bulk has a dielectric constant at infinitely high frequencies of at least 5.

4. The field grading material according to claim 1, wherein said particles have an aspect ratio of more than 1.

5. The field grading material according to claim 4, wherein the particles having an aspect ratio of more than 1 are randomly oriented in the matrix.

6. The field grading material according to claim 4, wherein the particles having an aspect ratio of more than 1 are oriented in essentially the same direction in the matrix.

7. The field grading material according to claim 4, wherein said particles having an aspect ratio of more than 1 are provided in the form of fibers, fibrils, whiskers, flakes, ellipsoids or tubes.

8. The field grading material according to claim 1, wherein said particles constitute less than 40% by volume of the field grading material.

9. The field grading material according to claim 1, wherein the matrix essentially consists of rubber, thermoplastics or thermoplastic elastomer.

10. The field grading material according to claim 9, wherein the matrix essentially consists of polyolefin rubber or thermoplastic polyolefin elastomer/plastomer, or of crystalline thermoplastics.

11. A device for grading an electric field in high-voltage applications, the device comprising:
a field grading material comprising a polymeric matrix comprising a filler, wherein the filler comprises a resistive and/or capacitive field grading effective amount of particles having at least one dimension smaller than or equal to 100 nm, and wherein said particles comprise any semiconducting material having an energy bandgap larger than 0 eV and smaller than 5 eV.

12. A method for grading an electric field at a joint or termination of a high-voltage electric power cable, the method comprising:
combining a polymer with a filler, wherein the filler comprises a resistive and/or capacitive field grading effective amount of particles having at least one dimension smaller than or equal to 100 nm, and wherein said particles comprise any semiconducting material having an energy bandgap larger than 0 eV and smaller than 5 eV;
forming a body of the polymer and filler; and
introducing the body into the cable joint or cable termination.

13. The field grading material according to claim 1, wherein the filler comprises a field grading effective amount of particles having one dimension between 5-50 nm.

14. The field grading material according to claim 1, wherein the filler comprises a field grading effective amount of particles having one dimension between 5-30 nm.

15. The field grading material according to claim 1, wherein said particles comprise ZnO or SiC.

16. The field grading material according to claim 1, wherein said particles comprise $Al_2O_3$, $TiO_2$ or $BaTiO_3$.

17. The field grading material according to claim 1, wherein said particles have an aspect ratio of more than 5.

18. The field grading material according to claim 17, wherein the particles having an aspect ratio of more than 5 are randomly oriented in the matrix.

19. The field grading material according to claim 17, wherein the particles having an aspect ratio of more than 5 are oriented in essentially the same direction in the matrix.

20. The field grading material according to claim 17, wherein said particles having an aspect ratio of more than 5 are provided in the form of fibers, fibrils, whiskers, flakes, ellipsoids or tubes.

21. The field grading material according to claim 1, wherein said particles have an aspect ratio of more than 10.

22. The field grading material according to claim 21, wherein the particles having an aspect ratio of more than 10 are randomly oriented in the matrix.

23. The field grading material according to claim 21, wherein the particles having an aspect ratio of more than 10 are oriented in essentially the same direction in the matrix.

24. The field grading material according to claim 21, wherein said particles having an aspect ratio of more than 10 are provided in the form of fibers, fibrils, whiskers, flakes, ellipsoids or tubes.

25. The field grading material according to claim 1, wherein said particles constitute less than 30% by volume of the field grading material.

26. The field grading material according to claim 1, wherein said particles constitute less than 20% by volume of the field grading material.

27. The field grading material according to claim 9, wherein the matrix includes Ethylene Propylene Diene Monomer rubber or silicone rubber, or polyethylene.

28. The device according to claim 11, further comprising
a cable joint or cable termination, wherein the body is arranged around a portion of the cable.

29. The field grading material according to claim 1, wherein the field grading material comprises less than 30% by volume of the filler particles.

30. The field grading material according to claim 1, wherein the field grading material comprises less than 20% by volume of the filler particles.

* * * * *

UNITED STATES PATENT AND TRADEMARK OFFICE
CERTIFICATE OF CORRECTION

PATENT NO. : 7,868,079 B2  Page 1 of 1
APPLICATION NO. : 10/531998
DATED : January 11, 2011
INVENTOR(S) : Carina Önneby et al.

It is certified that error appears in the above-identified patent and that said Letters Patent is hereby corrected as shown below:

(75) Inventors: "Lars Palmovist" should read

"Lars Palmqvist"

Signed and Sealed this
Fifth Day of April, 2011

David J. Kappos
*Director of the United States Patent and Trademark Office*